United States Patent
Fernley et al.

(10) Patent No.: US 8,336,846 B2
(45) Date of Patent: Dec. 25, 2012

(54) CRADLE ARRANGEMENT

(75) Inventors: Anthony Fernley, Lightwater (GB);
Richard J. R. Evans, Ickenham (GB)

(73) Assignee: Rolls-Royce PLC, London (GB)

( * ) Notice: Subject to any disclaimer, the term of this patent is extended or adjusted under 35 U.S.C. 154(b) by 501 days.

(21) Appl. No.: 12/453,727

(22) Filed: May 20, 2009

(65) Prior Publication Data
US 2009/0294625 A1    Dec. 3, 2009

(30) Foreign Application Priority Data

May 29, 2008  (GB) .................................. 0809646.3

(51) Int. Cl.
*F16M 3/00*    (2006.01)
(52) U.S. Cl. ................... 248/671; 248/346.01; 248/637; 123/195 R; 414/743
(58) Field of Classification Search .................. 248/671, 248/346.01, 637, 346.02; 52/309.1; 108/51.11; 123/195; 414/743, 728, 917; 254/10 C; 298/11
See application file for complete search history.

(56) References Cited

U.S. PATENT DOCUMENTS 2,920,773 A  *  1/1960  Knabe ........................... 414/743

* cited by examiner

*Primary Examiner* — Anita M King
(74) *Attorney, Agent, or Firm* — Oliff & Berridge, PLC

(57) ABSTRACT

It is necessary to support and manipulate such bulky items as gas turbine engines through appropriate cradle arrangements. It is necessary to allow robust presentation of the gas turbine engine upon a base such that it can be lifted to a position whereby the engine can be rotated to adjust the configuration of the engine within an arrangement. Such manipulation may minimize height or width dependent upon requirements. By provision of lever assemblies comprising lever arms linked together through a pivot link and a cross link rotation by an actuator of one assembly gives consistent presentation of the locator elements defining a center of rotation for the engine. The arrangement can be locked in a lowered condition for transportation or lifted to allow rotation and re-orientation of the engine with regard to external protuberances to limit width or height.

25 Claims, 2 Drawing Sheets

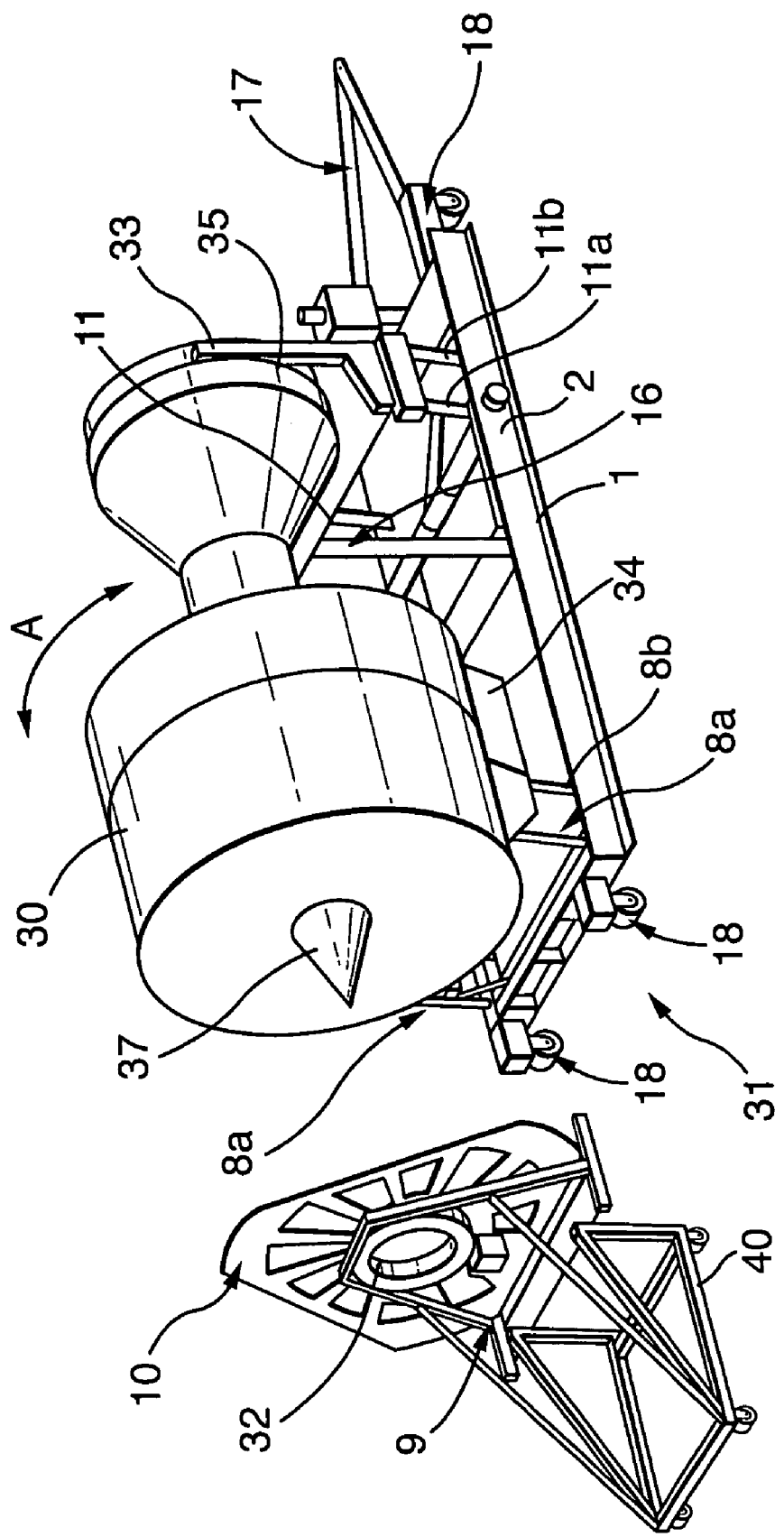

CRADLE ARRANGEMENT

CROSS-REFERENCE TO RELATED APPLICATIONS

This application is based on and claims the earlier benefit of priority from earlier Great Britain Patent Application No. 0809646.3 filed May 29, 2008, the description of which is incorporated herein by reference.

BACKGROUND

The present invention relates to cradle arrangements and more particularly to cradle arrangements utilized to transport large items such as gas turbine engines.

It will be appreciated that for convenient transportation of large items such as gas turbine engines, it is necessary to provide an appropriate cradle arrangement. Such cradle arrangements will allow lifting as well as lowering, manipulating, handling and movement of such bulky articles.

Traditional cradle arrangements for transportation of bulky items such as gas turbine engines have comprised a simple transportation stand. Such stands are also called a transport system or trolley or a dolly. The stand itself includes a base and a cradle formed by upstanding arms to engage appropriate parts of the bulky item, such as a gas turbine engine. Typically, such transportation cradle arrangements have been relatively specific to a particular bulky item. Thus, with regard to a gas turbine engine the cradle as indicated will be formed by upstanding arms, which will present rollers; trunnions; bearings; fasteners or pinned joints; or other means for connecting and securing the bulky gas turbine engine at parts on the gas turbine engine with sufficient strength to allow robust association. In such circumstances, it will be appreciated that the base for the cradle arrangement will typically allow lifting or lowering, and manipulation of the gas turbine engine. But once fixed upon the cradle arrangement the whole must be manipulated for transportation and access.

As bulky items increase in size it will be understood that problems with transportation increase along with difficulties attaching an engine to a stand and clearance between the engine and the stand, while remaining within acceptable transportation envelopes for different forms of transportation such as air, rail or road.

In view of the above previous transportation cradles tend to be labor intensive, require an overhead crane and separate tools and have limited height to width variation. Furthermore, such cradles cannot be readily utilized for final local assembly such as with regard to fitting an intake or a hot nozzle to a gas turbine engine while in the transportation cradle arrangement.

SUMMARY

In accordance with aspects of the present invention there is provided a cradle arrangement including a base presenting a first support and a second support, the first support and the second support associated with the base to present locator elements in a desired configuration relative to each other, the arrangement characterized in that the supports are associated with the base through respective lever assemblies secured at pivot mountings to the base, the lever assemblies are coupled together through a pivot link, at least one lever assembly having an actuator to turn the one lever assembly and the pivot link arranged to turn the other lever assembly in unison whereby the locator elements are displaced relative to the base while maintaining the desired configuration relative to each other.

Generally, the arrangement incorporates an end plate upstanding from the base. Typically, the end plate is detachable. Possibly, the end plate is presented within a slot formed within the base.

Generally, the arrangement includes end frames to present respectively the locator elements at each end of the base. Alternatively, the arrangement includes an intermediate frame between the end frames or instead of one end frame. Possibly, an end frame has an A frame configuration. Alternatively, an end frame has a U frame configuration.

Typically, at least one lever assembly includes a trapezoidal combination of lever arms respectively secured at spaced locations upon the base and to the locator elements.

Typically, the actuator includes a hydraulic ram with a cross link part to the one lever assembly.

Advantageously the arrangement includes an intermediate support locatable when the lever assemblies are turned away from the base.

Possibly, the locator elements provide rotatable mountings. Possibly, at least one of the locator elements is associated with a rotation driver.

Typically, the base is presented upon casters or other means for movement. Possibly, the base can be associated with tow bar assemblies to allow manipulation of the base.

Possibly, the locator elements include rollers to allow rotation of the engine in use.

BRIEF DESCRIPTION OF THE DRAWINGS

An embodiment of aspects of the present invention will now be described by way of example and with reference to the accompanying drawings in which.

DETAILED DESCRIPTION OF EMBODIMENTS

Figure 1:
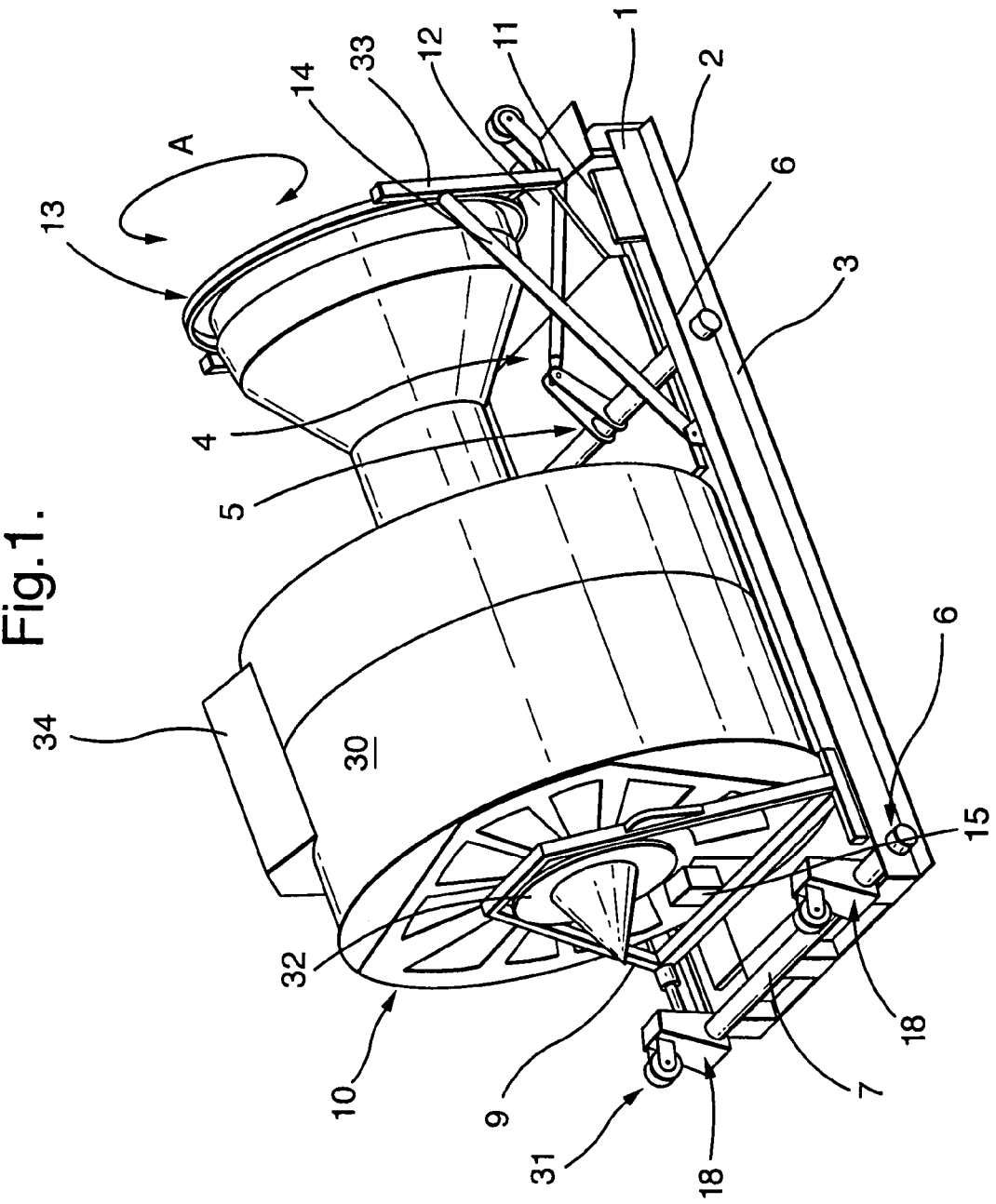
FIG. 1 is a schematic pictorial illustration of a cradle arrangement in accordance with aspects of the present invention in a lowered or transporter configuration; and, FIG. 2 is a schematic pictorial illustration of the arrangement depicted in FIG. 1 in a raised configuration to allow installation of an engine to a cradle, manipulation and access to a gas turbine engine in accordance with aspects of the present invention.

As indicated above convenience and accessibility with regard to transportation of relatively bulky items such as gas turbine engines is advantageous. In such circumstances ready location of the gas turbine engine upon a cradle arrangement is desirable as well as the capability with regard to rotation of that gas turbine engine to allow access to particular parts of the engine for assembly on site of such items as intakes.

FIG. 1 provides a pictorial illustration of an engine 30 secured to a cradle arrangement 31 in accordance with aspects of the present invention. The engine 30 is secured through locator elements 32, 33 at either end of the cradle arrangement 31. The configuration depicted in FIG. 1 is with the engine 30 lowered and therefore adjacent to a base 1 of the arrangement 31. The base 1 is secured to typically a pallet 2 of airfreight standard specification. Together they allow ready lifting and manipulation of the combination of the cradle arrangement 31 and the engine 30 in use. Normally the base 1 incorporates lifting features 3 such as channels for the forks of a forklift truck. As will be described later the locator elements 32 are presented upstanding as depicted from typically lever assemblies in accordance with aspects of the present invention. However, other locator elements such as locators which engage a periphery 33 of the engine 30 may also be associated with the lever assemblies. It is important that the relative position and configuration between the locator elements 32, 33 are maintained in a desired orientation in order to appropriately present the engine 30 upon the cradle 31. As indicated in FIG. 1 the engine 30 is lowered to be adjacent to the base 1 and therefore is ready for transportation within a desired space envelope. It will be understood in this lowered configuration the engine 30 may be able to rotate in the direction of arrowheads A whereby the exterior peripheral shape in terms of protrusions 34 can be turned dependent upon apertures through which the engine and associated cradle arrangement 31 must pass. Thus, for example with regard to an aircraft, an aircraft door may require a particular orientation of the engine 30 and the cradle 31 to allow entry while transportation on road transport may require positioning of the protuberances 34 to avoid overhang either side of the vehicle, or to limit height for low bridges.

Other elements of the arrangement 31 include an actuator 4 which acts upon a cross link 5 associated with one lever assembly in accordance with aspects of the present invention. The lever assemblies are connected through pivot links 6 connecting the one lever assembly at one end of the arrangement 31 with another lever assembly at the other end of the arrangement 31. In such circumstances through the pivot link 5 relative rotation of the lever assemblies can be achieved in unison such that the locator elements 32, 33 in such circumstances again turn in unison and maintain the desired configuration and spacing between them. Thus, the orientation of an engine or other item is maintained as that engine 30 is lifted from a lowered configuration as depicted in FIG. 1 to a raised configuration as depicted in FIG. 2.

As indicated above the arrangement 31 incorporates two lever assemblies. These lever assemblies include lever arms 8, 11 generally arranged in a trapezoidal arrangement either side of the base 1. The lever assemblies are secured to the base 1 through pivot mountings whereby cross links or members 5 extending from these mountings extend across the base 1. These cross links 5 act as torsion elements. A hydraulic ram 4 acts as an actuator for rotation of one cross link which turns one lever assembly including lever arms 11a, 11b in order to lift an end frame 35 in an upward direction. Through the pivot link 6 extending between the lever assemblies rotation of a further cross member 7 secured to a pivot mount causes rotation in unison with the first driven lever assembly in order to turn the respective lever arms 8a in an upwardly direction as depicted in FIG. 2. Thus the engine 30 is raised above the base 1. In this configuration the engine 30 may be more accessible and more conveniently be turned in the direction of arrowheads A.

As indicated above the lever assemblies generally include trapezoidal combinations of lever arms 8a, 8b and 11a, 11b secured at spaced locations on the base 1 as well as upon the engine 30 through locator elements 32, 33. In such circumstances through lever advantage effects and the hydraulic ram actuator 4 lifting and manipulation of the engine 30 is achievable. It will be noted that the protuberance 34 has been turned to be downward and towards the base 1 so adjusting the space envelope or cross-section of the combination of the engine 30 and the arrangement 31 for manipulation possibly through an aircraft door or otherwise.

It will be understood rotation is best achieved in a stable condition. In such circumstances generally support or end frames are provided. At one end an A frame 9 configuration may be provided which may extend upwardly from the base 1 in a slot in order to support the engine through a central shaft association provided by the locator element 32. To further facilitate such location typically a driver plate 10 will be provided and secured to a front end 37 of the engine 30. The plate 10 will allow rotation through a rotation driver 15 engaging the plate 10 appropriately.

Towards the rear of the embodiment depicted in FIG. 1 and FIG. 2 a support or end frame 35 has a generally U shaped configuration within which a support ring 13 is provided to allow rotation of the engine 30 in use. As depicted in FIG. 2 an upper portion of the ring 13 has been removed to allow further access and manipulation of the engine 30. It will be appreciated that generally in the lifted configuration as depicted in FIG. 2 the engine will no longer be transported but will be still retained within the arrangement 31 to allow securing of such features as intakes or otherwise to the engine 30 prior to installation on an aircraft.

Stability is obviously a key factor with regard to transportation as well as to allow manipulation of the engine prior to installation. In such circumstances as depicted in FIG. 1 additional support struts 14 may be provided to enhance robustness with respect to presentation of the rear end support frame 35. The struts 14 may be removed when no longer required. In the lifted state as depicted in FIG. 2 an additional intermediate support 16 may be provided to engage intermediate parts of the engine 30 and accommodate some of the engine load such that this load is not fully restrained by the actuator 4. It will also be understood that particularly in the lowered configuration as depicted in FIG. 1 and the fully deployed lifted configuration as depicted in FIG. 2 the lever assemblies including levers 8a, 8b, 11a, 11b may be locked through peg or other detents extending from the base or lock elements extending between them. Alternatively, other lock mechanisms for the lever assemblies could be provided.

As illustrated in FIG. 2 the plate 10 may be removable to allow greater access to that end of the engine 30. The plate 10 may be removable with the end support frame 9 upon an appropriate trolley 40. It will be appreciated the engine 30 is then presented solely upon the lever assembly provided by the lever arms 8a, 8b of the arrangement 31 and upon the other support frame 35 at the other end. Generally the associations between the lever assembly formed by the arms 8a, 8b will be upon roller or other devices to allow rotation of the engine 30 in the direction of arrowheads A. Similar roller elements will be provided in the frame 35 through the ring 13 to allow such rotation in the direction of arrowheads A. As indicated above removal of the plate 10 will allow access to that end of the engine 30 in order to allow association of intakes or other devices prior to installation of the engine within an aircraft.

The cradle arrangement 31 in accordance with aspects of the present invention is to facilitate manipulation and transportation of the engine 30. In such circumstances generally the base 1 and/or the pallet 2 will be associated with castors 18 or other devices to allow movement of the arrangement 31 with engine 30 upon it in use. In order to further assist such movements the base 1 and/or the pallet 2 may be associated with tow bars 17 whereby the arrangement 31 can be pulled.

In view of the above it will be appreciated that aspects of the present invention utilize frames defined by plate 10 and a support ring 13 in order to appropriately present and locate the engine 30 upon the arrangement 31. Furthermore, through appropriate rotational bearings as locator elements 32, 33 in respectively the support frames 9, 35 rotation of the engine 30 about its principal axis is achievable. Such rotation allows access to parts of the engine 30 as well as manipulation to vary the presented cross-sectional shape of the combination.

Support at each end of the arrangement 31 is presented upon the base 1 which incorporates lift lever assemblies formed by lever arms 8, 11. These lever arms 8, 11 enable displacement of the engine 30 to raise and lower the engine 30 centerline as required relative to the base 1.

The front and rear lever assemblies as indicated provide lift which in turn is powered by a hydraulic ram 4 as an actuator. The ram 4 turns a cross link 5 in order to turn one lever assembly which through an appropriate pivot link 6 turns the other lever assembly in unison. The lever assembly generally has a torque tube which extends as the cross link 5 to pivot between mounting points and then through the pivot member or link 6 turns the other lever assembly. Turning of the front lever assembly and the rear lever assembly is therefore in unison and synchronized.

Dependent upon requirements and engine geometry it will be understood that the amount of lift provided by the lever assemblies can be adjusted to requirements and to enable the engine typically to be raised sufficiently to allow rotation of the engine 30 in the direction of arrowheads A to a desired angle. It will be understood in some circumstances and provided sufficient lift can be provided relative to the external radial extent of protrusions 34 and others it may be possible in some circumstances to allow 360° rotation. The degree of lift as well as rotation will be chosen to adjust the cross-sectional area shape of the engine 30/arrangement 31 combination.

In order to facilitate rotation the engine 30 typically the plate 10 can be turned by a rotational drive mechanism 15. This drive mechanism 15 will be secured to the support frame 9. At the rear end of the engine 30 as indicated typically a two piece support will be provided as the ring 13 which is attached to the core of the engine 30 about handling features. The support ring 13 is then secured to the support frame 12 through appropriate bearings to allow free rotation at this end of the engine 30. Thus, the actuator 5 at the rear end allows lifting of the engine 30 while a rotation driver 15 at the other end allows rotation of the engine 30.

It will be understood that locking devices as described above can be incorporated within the rotation mechanisms and with regard to the lever assemblies utilized for lifting in order to safely and robustly disable the rotation mechanisms and lock the arrangement for transportation.

A particular feature of aspects of the present invention is the ability to disassemble and remove the support frame 9 to allow access. In such circumstances the arrangement 31 should still remain robust. To facilitate such robust presentation of the engine typically an intermediate and demountable support 16 will be provided. The demountable support 16 will typically take the form of engine core trunnions which are connected to the core before removal of for example a front support frame 9 and plate 10 for stability. Such removal of the front support frame 9 and plate 10 will provide access to allow intake installation and engine installation on to an aircraft. In order to allow removal of the engine 30 in such circumstances generally as indicated a top half of a rotating split ring 13 utilized by the rear frame 35 will be removed prior to such installation operations.

It will be understood as indicated above locator elements 32, 33 are utilized in the arrangement 31 in accordance with aspects of the present invention to maintain engine stability particularly during roll. The relative configuration and presentation of the locator elements 32, 33 in such circumstances is important and should be maintained through the lifting and rotation processes. By the relatively fixed relationship between the locator elements 32, 33 it will be understood that engine stability can be maintained relative to the engine main or shaft axis within the arrangement 31 throughout lifting and rotation.

Cradle arrangements 31 in accordance with aspects of the present invention allow rotation and height change with regard to an engine presented upon an arrangement 31 in accordance with aspects of the present invention. Such rotation and adjustment in height allows manipulation to present the combination of the engine 30 and a cradle arrangement 31 differently to meet space constraints. When an engine 30 is rolled and lowered it will be understood that the engine 30 upon its cradle 31 may be able to pass through apertures which when presented in another orientation would not be achievable.

In terms of loading the engine 30 upon the cradle arrangement 31 in accordance with aspects of the present invention typically initially plate 10 and frame 9 will be fitted to the engine. The rear frame 13 could also be fitted at this stage. The engine is then lowered together with plate 10 and frame 9 which will engage in to lever assembly 8. At the same time the rear of the engine and frame 13 is engaged in to the support assembly or frame 12.

As indicated above the arrangement 31 is generally prepared for acceptance of the engine 30 with the respective lever arms 8, 11 in an upright presentation. Once the engine is secured any intermediate supports 16 will be removed to allow displacement to a lowered position (FIG. 1). In such circumstances the engine 30 upon the frames 9, 12 will be lowered. It will be understood that the frames 9, 12 may be associated with the lever assemblies to lower the frames 9, 12 into slots or otherwise fixed associations with the base to secure the engine 30. The front support frame 9 engages with the front lever arms 8 and the rear frame 13 engages the rear support frame 12.

Once lowered, it will be appreciated that the engine 30 will generally have a smaller cross sectional envelope to allow as indicated entry and transportation through air freight, road freight or other means. The engine 30 may be manipulated to achieve minimum head height or minimum width by appropriate turning to minimize the impact of protuberances 34 as required. It will be understood that the location and presentation of engine external protuberances 34 can be determined by the angle of rotation required to achieve a desired envelope.

In terms of turning the engine 30 it will be understood that the rotation driver 15 will be utilized. The rotation driver 15 drives or rotates the plate 10 attached to the engine 30 and therefore the engine 30 itself. It will be understood that rotational bearings are generally provided between the plate 10 and the support frame 9 to ensure the engine 30 remains upon a desired rotational centerline. At the rear, the support defined by the split ring 13 upon the rear support frame 12 again defines a centerline for rotation upon which the engine 30 can turn. It will be understood that the rotational driver 15 will be stopped when the desired angle of rotation is achieved for positioning of engine externals as required for a head height or minimum width, etc. Once rotated to the desired orientation it will be understood that the engine 30 along with the cradle arrangement 31 will be locked utilizing pins or fasteners or other mechanisms. The fasteners (not shown) at the front end will act between the front support frame 9 and the rotating driver frame 10. At the rear end the locking mechanisms will typically act between the support frame 12 and the split ring 13. The rear split ring 13 could also be a plate that is bolted to the rear of an engine, however this would also restrict engine access more and restrict specific functionality of the engine stand.

In order to lower the engine generally an actuator 4 in the form of a hydraulic ram is utilized. By changing the effective length of the actuator 4 it will be understood that the cross member 5 is turned and therefore the associated lever assembly turned with its lever arms 11a, 11b such that these arms 11a, 11b become adjacent to the base. The actuator 4 generally turns the cross member as a torque tube 5. This rotation of the torque tube 5 through appropriate pivot linkages to pivot mountings 6 reciprocates and causes similar rotation of both the cross members 5, 7 for the respective lever assemblies defined by the lever arms 8, 11. In such circumstances the relative position of the locator elements 32, 33 upon which the engine is supported is maintained through the lowering or lifting process. By rotation of the cross members 5, 7 effectively the front and rear lever assemblies in terms of arms 8, 11 are turned about the pivot mountings 6.

The arrangement 31 as indicated above provides a parallel or trapezoidal lever mechanism for mechanical advantage. In such circumstances robust and consistent lowering or lifting of the front and rear lever assemblies is achieved by driving only one lever assembly with one actuator 4. It will be understood that the lowering or lifting of the engine 30 in turn lowers or lifts the engine centerline of rotation. The centerline of rotation is defined by the desired configuration between the locator elements 32, 33 of the arrangement 31. The centerline between the elements 32, 33 in such circumstances is consistent and moves downward as the engine 30 is lowered or upward as the engine 30 is lifted. Once in an appropriate configuration the engine 30 within the arrangement 31 is locked in position through appropriate fastening mechanisms (not shown) for the lever arms 8, 11 relative to the base 1 of the arrangement 31.

Operation with regard to lifting the engine generally is the reverse of that described above with regard to lowering of the engine in terms of operational performance achieved through action of the actuator 4 to turn the respective lever assemblies and therefore lift the centerline of the engine to that desired.

By aspects of the present invention it will be understood that an engine 30 can be manipulated to achieve a narrower width or reduced height through appropriate rotation and adjustment of the engine centerline of rotation. Such an approach ensures greater access with regard to the engine 30 and as indicated may allow complete 360° rotation of the engine 30 where required in order to improve access to the engine 30 for installation and maintenance.

It will be appreciated that the plate 10 utilized with regard to the embodiment described above may have disadvantages particularly for access. In such circumstances where appropriate a split two piece support ring may be used instead of the plate 10. The support ring may be similar to that utilized with regard to the rear support. However, such a split ring would be much larger and it will be understood a stronger ring would be needed at the front of the engine 30 in comparison with the rear of the engine in view of the weight distribution within the engine 30. However, an advantage with regard to provision of such a split ring at the front end would be that it would not be necessary to remove the support frame 9 which generally is in the form of an A frame to allow installation and access to that end of the engine 30. In such circumstances without the necessity for removing the frame 9 it will be understood that intermediate support 16 would not be required and therefore less handling features and locations upon the engine may be needed. Exclusion of the need for the intermediate support would also reduce complexity and component count. As an alternative, and dependent upon the centre of gravity for the engine, an intermediate frame could be provided between the end frames for additional support or an intermediate frame could replace one of the end frames.

Aspects of the present invention relate particularly to gas turbine engines but it will be understood that other pieces of apparatus and equipment which require rolling and lowering to allow the item to be manipulated through doorways or orifices or to allow access and maintenance or inspection could be utilized with respect to aspects of the present invention.

Modifications and alterations to aspects of the present invention will be understood by those skilled in the art. Thus for example the intermediate support 16 may include a telescopic or pivot frame deployable as required by upward rotation from an association with the base. It will also be understood that the rotation driver mechanism may be a stepper motor to allow accurate positioning of the engine 30 through more accurate controlled rotation about the centerline of the engine defined by the locator elements 32, 33 in accordance with aspects of the present invention.

We claim:

1. A cradle arrangement for a gas turbine engine having a longitudinal axis, comprising:
    a base having a first support and a second support, the first support and the second support associated with the base to present locator elements in a configuration relative to each other;
    lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and
    an end plate upstanding from the base, the end plate being generally normal to the longitudinal axis and configured to engage with an end of the gas turbine engine, wherein the end plate is presented within a slot formed within the base.

2. The arrangement of claim 1, wherein the end plate is detachable.

3. The arrangement of claim 1, wherein the arrangement includes end frames to present respectively the locator elements at each end of the base.

4. The arrangement of claim 1, wherein the actuator comprises a hydraulic ram with a cross link part to the one lever assembly.

5. The arrangement of claim 1, wherein the locator elements provide rotatable mountings.

6. The arrangement of claim 1, wherein the base is presented upon casters or other means for movement.

7. The arrangement of claim 1, wherein the base can be associated with tow bar assemblies to allow manipulation of the base.

8. A cradle arrangement comprising:
    a base having a first support and a second support, the first support and the second support associated with the base to present locator elements in a configuration relative to each other;
    lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and
    end frames to present respectively the locator elements at each end of the base, wherein an end frame has a U-frame configuration.

9. A cradle arrangement for a gas turbine engine having a longitudinal axis, comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and an end plate upstanding from the base, the end plate being generally normal to the longitudinal axis and configured to engage with an end of the gas turbine engine, wherein at least one lever assembly comprises a trapezoidal combination of lever arms respectively secured at spaced locations upon the base and to the locator elements.

10. A cradle arrangement for a gas turbine engine having a longitudinal axis, comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and an end plate upstanding from the base, the end plate being generally normal to the longitudinal axis and configured to engage with an end of the gas turbine engine, wherein the arrangement includes an intermediate support locatable when the lever assemblies are turned away from the base.

11. A cradle arrangement for a gas turbine engine having a longitudinal axis, comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and an end plate upstanding from the base, the end plate being generally normal to the longitudinal axis and configured to engage with an end of the gas turbine engine, wherein at least one of the locator elements is associated with a rotation driver.

12. A cradle arrangement for a gas turbine engine having a longitudinal axis, comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and an end plate upstanding from the base, the end plate being generally normal to the longitudinal axis and configured to engage with an end of the gas turbine engine, wherein the locator elements include rollers to allow rotation of the engine in use.

13. A cradle arrangement comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and end frames to present respectively the locator elements at each end of the base, wherein an end frame has an A-frame configuration.

14. The arrangement of claim 13, wherein the arrangement includes an intermediate frame between the end frames or instead of one of the end frames.

15. The arrangement of claim 13, wherein the base is presented upon casters or other means for movement.

16. The arrangement of claim 13, wherein the base can be associated with tow bar assemblies to allow manipulation of the base.

17. A cradle arrangement comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other;

wherein at least one lever assembly comprises a trapezoidal combination of lever arms respectively secured at spaced locations upon the base and to the locator elements.

18. The arrangement of claim 17, wherein the base is presented upon casters or other means for movement.

19. The arrangement of claim 17, wherein the base can be associated with tow bar assemblies to allow manipulation of the base.

20. A cradle arrangement comprising:

a base having a first support and a second support, the first support and the second support associated with the base to present locator elements in a configuration relative to each other;

lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other; and an intermediate support locatable when the lever assemblies are turned away from the base.

21. The arrangement of claim 20, wherein the base is presented upon casters or other means for movement.

22. The arrangement of claim 20, wherein the base can be associated with tow bar assemblies to allow manipulation of the base.

23. A cradle arrangement comprising:
   a base having a first support and a second support, the first support and the second support associated with the base to present locator elements in a configuration relative to each other;
   lever assemblies secured at pivot mountings to the base, the lever assemblies are coupled together through a pivot link, at least one lever assembly includes an actuator to turn the one lever assembly and the pivot link arranged to turn the other lever assembly in unison, whereby the locator elements are displaced relative to the base while maintaining the configuration relative to each other;
   wherein at least one of the locator elements is associated with a rotation driver.

24. The arrangement of claim 23, wherein the base is presented upon casters or other means for movement.

25. The arrangement of claim 23, wherein the base can be associated with tow bar assemblies to allow manipulation of the base.

* * * * *